United States Patent [19]

Shimajiri et al.

[11] 4,206,392
[45] Jun. 3, 1980

[54] SPINDLE CONTROL SYSTEM

[75] Inventors: Tokiji Shimajiri, Kawasaki; Kiyoshi Hattori, Tachikawa, both of Japan

[73] Assignee: Fujitsu Fanuc Limited, Japan

[21] Appl. No.: 898,696

[22] Filed: Apr. 21, 1978

[30] Foreign Application Priority Data

Apr. 28, 1977 [JP] Japan .................................. 52/49579

[51] Int. Cl.² ............................................ G05B 19/28
[52] U.S. Cl. .................................... 318/602; 318/571; 318/596
[58] Field of Search ................. 318/596, 602, 592, 571

[56] References Cited

U.S. PATENT DOCUMENTS

| | | | |
|---|---|---|---|
| 3,315,266 | 4/1967 | Lapinski | 318/602 X |
| 3,576,986 | 5/1971 | Brickner | 318/592 X |
| 3,670,228 | 6/1972 | Crosby | 318/602 X |
| 3,752,969 | 8/1973 | Kiffmeyer et al. | 318/602 |
| 3,760,249 | 9/1973 | Connors | 318/592 |
| 4,021,714 | 5/1977 | Jones et al. | 318/595 X |
| 4,143,310 | 3/1979 | Fujinawa et al. | 318/57 |

*Primary Examiner*—B. Dobeck
*Attorney, Agent, or Firm*—Staas & Halsey

[57] ABSTRACT

In a spindle control system in which a pulse coder is coupled with a spindle; a pulse train signal, derived from the pulse coder upon each rotation of the spindle through a predetermined rotational angle, is converted into an analog signal corresponding to the actual rotational speed of the spindle; and the analog signal is compared with a commanded speed signal to drive the spindle at the commanded speed. Upon application of a command for stopping the spindle at a predetermined position, a predetermined numerical value is set in an error register in accordance with a specified position signal from the pulse coder, the pulse train signal from the pulse coder is fed back to the error register, and the rotational position of the spindle is controlled with a signal corresponding to the content of the error register.

7 Claims, 5 Drawing Figures

SPINDLE CONTROL SYSTEM

BACKGROUND OF THE INVENTION

1. Field of the Invention

This invention relates to a spindle control system for machine tools, and more particularly to an inexpensive spindle control system which neither requires a spindle positioning pin or like mechanical parts nor calls for the provision of an additional detecting means on the spindle for stopping it at a specified rotational angular position.

2. Description of the Prior Art

In a machine tool, in particular, a machine tool provided with an automatic tool changer, after a series of machining operations of a work with a tool secured to the spindle, the tool is removed from the spindle and stored in a tool storage magazine, and then a different tool is selected and secured to the spindle for a subsequent machining operation. The tool stored in the tool storage magazine is selected again and secured to the spindle for machining as required. For maintaining high machining accuracies it is necessary that the tool be secured to the spindle always in the same angular relationship thereto.

Further, it is known that the spindle and the tool are keyed to each other so as to ensure transmission of the rotation of the former to the latter. To perform this, when the tool once withdrawn from the spindle is secured again thereto, they must be engaged with each other at a specified relative rotational angular position. Accordingly, in the case of stopping the spindle when required to change the tool, it is desired to stop the spindle at a specified rotational angular position.

In the prior art, for stopping the spindle at such a specified position, a switch is provided which is actuated when the spindle has reached the specified rotational angular position, and a lock pin is inserted into the spindle in response to the actuation of the switch to stop the rotation of the spindle and retain it at the specified position.

However, such a conventional mechanism requires the provision of a special switch on the spindle and a mechanical lock mechanism for holding the spindle at its stopped position, and hence has the defect that the apparatus is complicated and expensive.

Moreover, it is known to drive the spindle with a hydraulic spindle motor through transmission gears, as set forth in U.S. Pat. No. 3,704,510 by Robert K. Sedgwick et al. The spindle motor is controlled in speed so that the output voltage of a tachometer generator for detecting the actual speed of the spindle may become equal to a command voltage.

For stopping the spindle at a specified rotational angular position, a synchro (resolver) is coupled with the spindle and the spindle motor is stopped at a rotational angular position indicated by a reference voltage. That is to say, in the case of stopping the spindle at a constant position, an error operator for the speed control is disconnected from a servo amplifier of the spindle motor, and the reference voltage and the synchro and a discriminator are connected to the servo amplifier via contacts. The rotor of the synchro is driven by the spindle and the spindle motor is stopped at the position where the output from the discriminator becomes zero.

The above conventional mechanism requires a detector for the position control, that is, the snychro, in addition to a detector for the speed control, that is, the tachometer generator. The position control using the synchro involves many circuit elements and hence is complex. The reason is that there must be provided a circuit for generating a sine wave and a cosine wave for exciting the synchro, a circuit for detecting the phase of an output signal and so on. Additionally, adjustment of the synchro is troublesome and must be effected after checking the sine wave and the cosine wave through the use of an oscilloscope.

SUMMARY OF THE INVENTION

This invention has for its object to provide a simple-structured spindle control system for controlling a spindle of a machine tool to stop at a constant position.

Another object of this invention is to provide a spindle control system for controlling a spindle of a machine tool to stop at a constant position by the employment of a pulse coder for speed control.

Briefly stated, in this invention, a pulse coder is connected with a spindle of a machine tool, and a pulse train, which is derived from the pulse coder for each constant angular rotational movement of the spindle, is converted to an analog signal. The analog signal is compared with a signal of a commanded speed. Upon application of a demand for stopping the spindle at a constant position, a numerical value is set in an error register in accordance with a specified position pulse from the pulse coder, and the pulse train from the pulse coder is fed back to the error register to control the rotation of the spindle in accordance with the content of the error register, thus achieving control for stopping the spindle at the constant position.

With this invention, a pulse coder for speed control can be used as a detector for position control. Further, since a digital element is employed, the position control loop used is inexpensive and easy to adjust.

Other objects, features and advantages of this invention will become more fully apparent from the following description taken in conjunction with the accompanying drawings.

DESCRIPTION OF THE PREFERRED EMBODIMENTS

Figure 1:
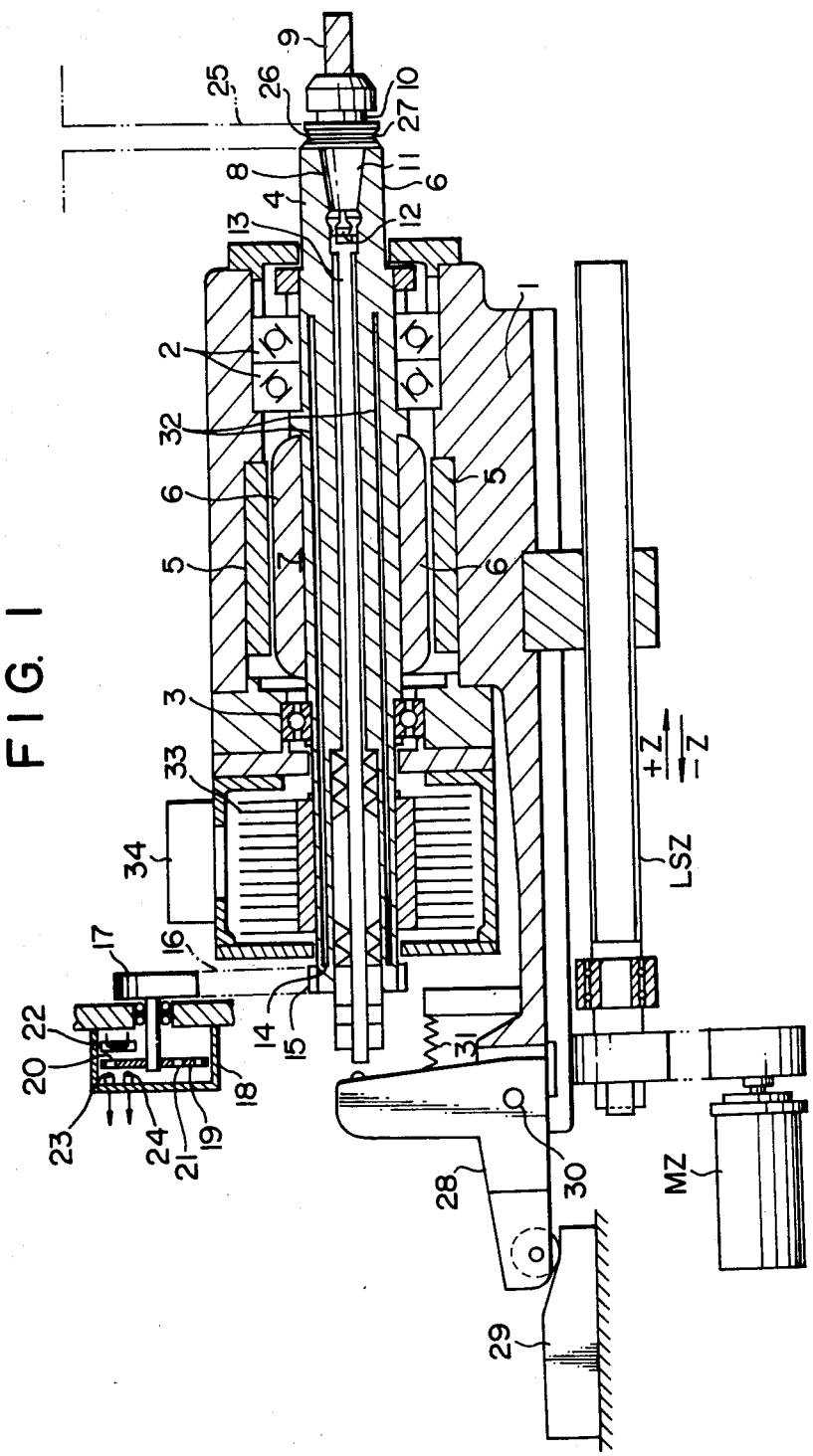
FIG. 1 is a sectional view of a headstock part of a machine tool with an automatic tool changer, showing an embodiment of this invention.

FIG. 1 shows in section the headstock part of a machine tool with an automatic tool changer embodying the system of this invention.

In FIG. 1, reference numeral 1 indicates a headstock, which rotatably supports a spindle 4 with bearings 2 and 3. Inside of the headstock 1, a permanent magnet field system 5 for a spindle motor is provided opposite an armature winding 6 disposed on the outer periphery of the spindle 4. The field system 5 and the armature winding 6 constitute a DC spindle motor 7, the rotor shaft of which forms the spindle 4.

The right-hand top end portion of the spindle 4 has formed therein a tapered hole 8 for receiving a tapered portion 11 of a tool holder 10 of a tool 9. A pullstud 12 at the top of the tool holder 10 is engaged with the top end portion of a drawbar 13 provided in the hollow portion of the spindle 4. Since the drawbar 13 is pulled by a dished spring 14 leftwardly (i.e., in the direction Z in FIG. 1), the tool 9 is locked with the spindle 4 in the state shown in FIG. 1. Accordingly, the tool 9 is driven with the rotation of the spindle motor 7.

At the left-hand end portion of the spindle 4, a timing pulley 15 is provided for controlling the revolving speed of the spindle 4 and stopping it at a predetermined position. The pulley 15 is coupled with a pulse coder 18 via timing belts 16 and 17.

The pulse coder 18 is constructed to produce one pulse for each rotational movement of the spindle 4 through a predetermined small angle and one pulse at a specified rotational position of the spindle 4. In the illustrated embodiment, a slit disc 19 of the pulse coder 18 turns once for each rotation of the spindle 4. The slit disc 19 has a plurality of slits 20 formed at predetermined intervals in a channel on one circumference of the disc and one slit 21 in a channel on another circumference. A pair of photo detectors 23 and 24 are disposed in opposing relation to a light source 22 with the slit disc 19 being positioned between the detectors and the light source. The photo detector 23 produces a pulse train signal which is composed of pulses, each pulse occuring for each rotational movement of the spindle 4 through the small angle. The other photo detector 24 produces one specified position pulse at the specified angular position of the spindle 4 during rotational movement.

FIG. 1 shows the state in which the spindle 4 is stopped at its predetermined position. When withdrawing the tool 9 from the spindle 4, a tool-holding recessed member 26 of a tool storage magazine 25 is moved perpendicularly to the tool holder 10 into engagement with a circumferential groove 27 of the tool holder. Then, the headstock 1 is moved in the direction $-Z$ by a feed motor MZ and a feed screw LSZ. Through this action a bell crank 28 is turned by a plate cam 29 clockwise about a shaft 30 against the action of a spring 31 to urge the left-hand end of the drawbar 13 into the spindle 4 in the direction $+Z$. As a result of this, the pullstud 12 of the tool holder 10 is released from its locked position by the drawbar 13, the tool 9 and the tool holder 10 are held in the tool storage magazine 25, and the spindle 4 moves apart from the tool holder 10 to assume a position retracted in the direction $-Z$. The tool 9 is held in the tool storage magazine 25 so as not to turn.

In the case of subsequently using the tool 9, after the spindle 4 is stopped at its specified rotational angular position, the headstock 1 is moved in the direction $+Z$ to engage the spindle 4 with the tool holder 10, and the pullstud 12 is locked by the drawbar 13. As a result of this, the tool 9 and the spindle 4 are always intermeshed for locking in the same angular relationship to each other.

In FIG. 1, reference numeral 32 indicates heat pipes for cooling the spindle 4; 33 designates radiator fins; and 34 identifies a fan motor for cooling.

Figure 2:
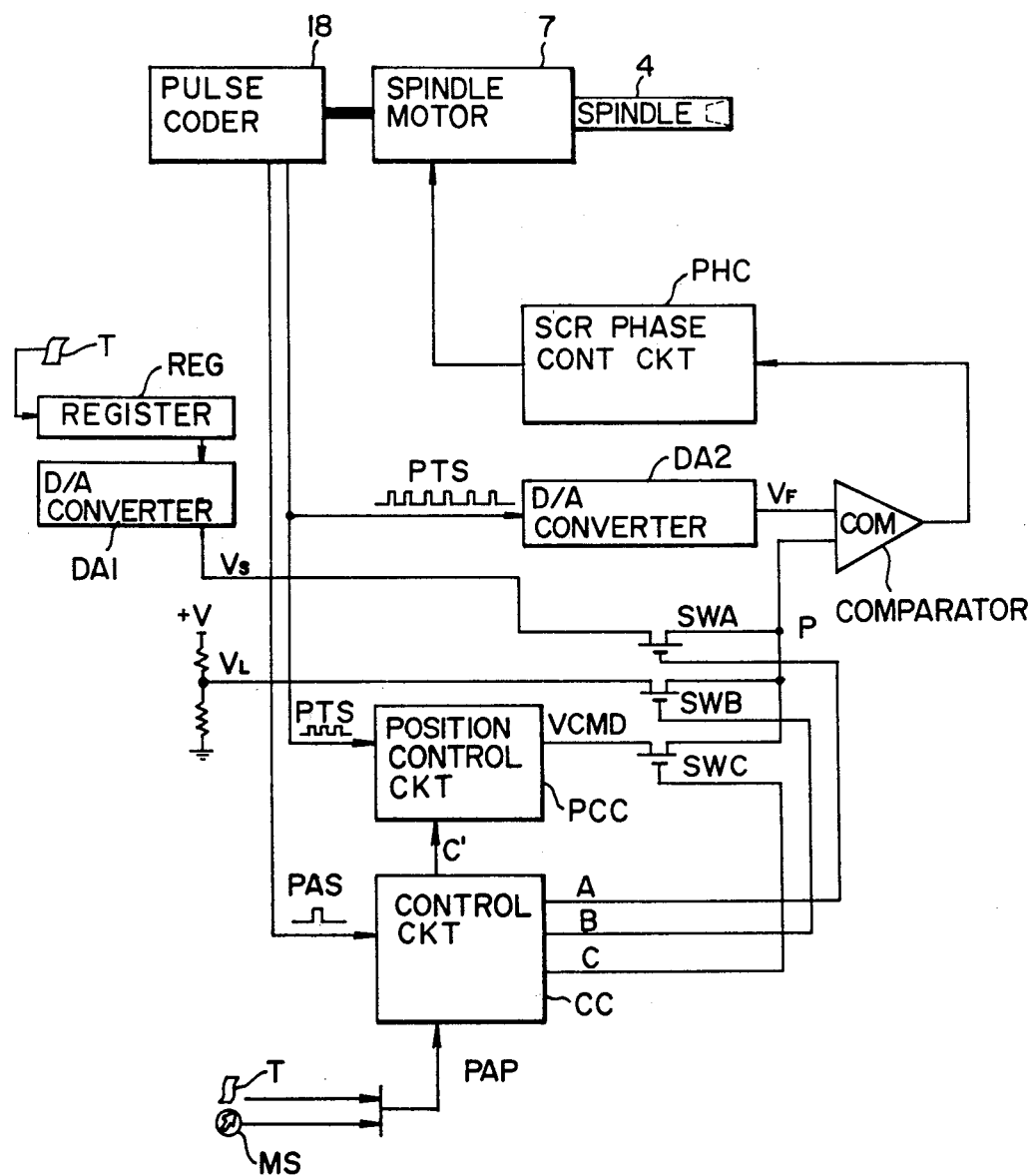
FIG. 2 is a block diagram illustrating the embodiment of this invention.

FIG. 2 is a block diagram of an embodiment of this invention. In the case of controlling the rotational speed of the spindle 4, a commanded speed is instructed by an instruction tape T, and the instructed speed value is stored in a register REG and is converted by a D-A converter DA1 to an instruction analog voltage $V_S$. $V_S$ is applied to an analog switch SWA, a control circuit CC provides a control signal A to turn ON analog switch SWA through which the instruction voltage $V_S$ is then applied to one input terminal of a comparator COM. A pulse train signal PTS, derived from the pulse coder 18 coupled with the spindle motor 7 of the spindle 4, is converted by a D-A converter DA2 to an analog voltage $V_F$ proportional to the motor speed. The analog voltage $V_F$ is applied to the other input terminal of the comparator COM. The comparator COM compares the instruction speed voltage $V_S$ and the actual motor speed voltage $V_F$ with each other and controls the trigger phase of an SCR phase control circuit PHC in a manner to make the latter match with the former, thus rendering the actual speed of the spindle motor 7 equal with the instructed speed.

When an instruction signal PAP for stopping the motor at its predetermined position has been produced by the instruction tape T or a manual switch MS, the control circuit CC immediately turns OFF the control signal A and ON a control signal B. Signal B is applied to an analog switch SWB which also receives a predetermined low-speed instruction voltage $V_L$. As a result of the above action, only analog switch SWB is turned ON to apply therethrough the predetermined low-speed instruction voltage $V_L$ to the comparator COM, shifting the spindle motor 7 to its low-speed revolving state.

After this, when a predetermined position signal PAS from the pulse coder 18 first reaches the control circuit CC, the circuit CC turns OFF the signal B and ON a control signal C and provides a preset signal C' to a position control circuit PCC. Control signal C is fed to a switch SWC. As a result of this, a certain value $\alpha$ is preset in an error register of the position control circuit PCC, and the switch SWB is turned OFF and the switch SWC ON.

The pulse train signal PTS from the pulse coder 18 is fed back to the error register of the control circuit PCC, and a voltage VCMD proportional to the content of the error register is applied via the switch SWC to an instruction input terminal of the comparator COM.

Thus, the spindle motor 7, the pulse coder 18, the position control circuit PCC, the comparator COM, the phase control circuit PHC and the digital-to-analog converter DA2 make up a rotational position control servo loop for the spindle 4. Accordingly, the spindle motor 7 is controlled by the control servo loop to stop the spindle 4 at the position, at which the pulses obtained from the pulse train signal PTS correspond in number to the above-said preset value $\alpha$ measured from the position of the spindle 4 at which the signal PAS was derived from the pulse coder 18.

Figure 3:
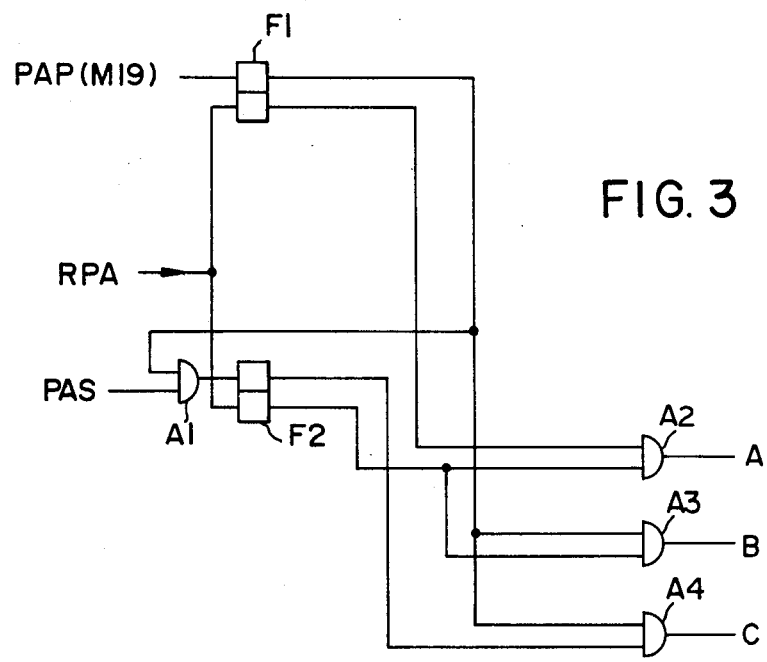
FIG. 3 is a logical circuit diagram of a control circuit utilized in FIG. 2.

FIG. 3 is a logical circuit diagram illustrating in detail the control circuit CC utilized in the embodiment of FIG. 2.

The control circuit CC is composed of flip-flop F1 and F2 and AND gates A1 to A4. In the initial state of the control circuit CC, the flip-flops F1 and F2 are held in their reset state and the signal A appears via the gate $A_2$.

When the signal PAP (in the case of providing the instruction from the tape, a miscellaneous function command M19, for instance) has been provided, the flip-flop F1 is immediately turned ON to turn OFF the signal A, and the control signal B is turned ON via the gate A3. Next, upon occurrence of the first specified rotational angular signal PAS from the pulse coder, the flip-flop F2 is set via the gate A1 to turn OFF the signal B and ON the signal C, achieving the control operation described above with regard to FIG. 2. After completion of stopping of the spindle 4 at the predetermined position, the flip-flops F1 and F2 are resettable with a release signal RPA.

Figure 4:
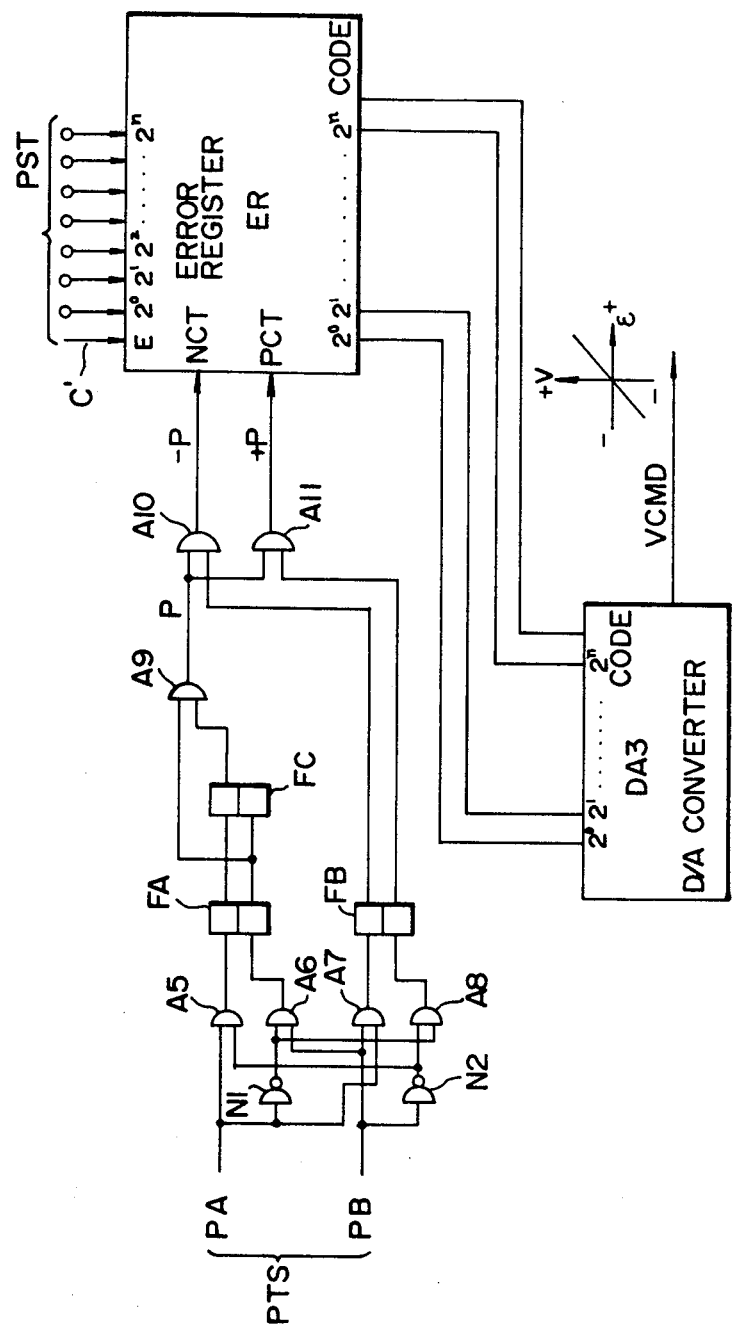
FIG. 4 is a logical circuit diagram of a position control circuit used in FIG. 2.

FIG. 4 is a detailed logical circuit diagram of the position control circuit PCC used in the embodiment of FIG. 2.

The position control circuit PCC comprises inverters N1 and N2, AND gates A5 to A11, flip-flops FA, FB and FC, an error register ER and a digital-to-analog converter DA3.

The pulse train signal PTS from the pulse coder 18 is composed of signals PA and PB which are displaced 90 degrees apart in phase, and one pulse (of one clock time width) appears at the output of the AND gate A9 for each period of the signal PTS. Where the spindle rotates in its positive direction, the AND gate A10 is turned ON and the aforesaid pulse is applied to a negative count terminal NCT of the error register ER to subtract 1 from its content. In the case of the spindle revolving in its negative direction, and AND gate A11 is turned ON and the output pulse from the AND gate A9 is provided to a positive count terminal PCT of the error register ER to add 1 to its content.

The error register ER is formed as a preset and signed reversible binary counter, in which the numerical information (α) at preset terminals PST can be set by the application of a preset signal C' (the rise-up of the control signal C in FIG. 2) to a terminal E, and which performs the −1 subtraction or +1 addition of its content upon each application of aforesaid pulse to the terminal NCT or PCT.

The D-A converter DA3 is connected to the error register ER to generate the voltage VCMD proportional to its content ε. Accordingly, when the content of the error register ER has been reduced to zero, the voltage VCMD to be fed to the comparator COM becomes zero to stop the spindle motor.

Figure 5:
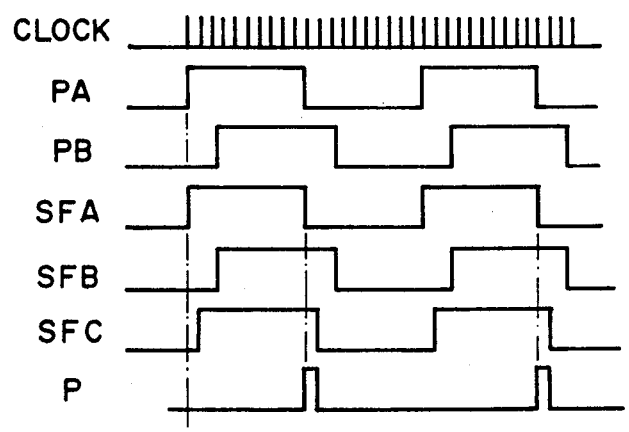
FIG. 5 is a waveform diagram explanatory of the operation of the circuit shown in FIG. 4.

FIG. 5 is an operation flow chart showing the process of obtaining the output pulse P (in the case of the spindle motor revolving in the positive direction) of the AND gate A9 in FIG. 4. In FIG. 5, CLOCK indicates a clock pulse; SFA, SFB and SFC designate set output pulses of the flip-flops FA, FB and FC; and PA and PB identify the signals displaced apart in phase, which are derived from the pulse coder 18.

Although the present invention has been described above in connection with case where the spindle motor shaft and the spindle are formed as a unitary structure, the invention is also applicable to the case where they are formed independently of each other. Further, in the foregoing, the pulse coder is described to provide one pulse every rotation of the spindle as the specified position pulse signal, but it is also possible to count the pulse train signal with a counter having a predetermined capacity and use an overflow pulse therefrom as such a specified position pulse signal.

As has been described in the foregoing, this invention provides a simple-structured and inexpensive spindle control device which is capable of controlling a spindle to stop at a predetermined rotational position by utilizing a pulse coder for the speed control of the spindle motor without requiring any special detector and which does not involve any mechanical pin mechanisnm for retaining the spindle at the predetermined position.

It will be apparent that many modifications and variations may be effected without departing from the scope of the novel concepts of this invention.

What is claimed is:

1. A spindle control system in which a pulse coder is coupled with the spindle of a machine tool, a pulse train signal produced from the pulse coder upon each rotation of the spindle through a predetermined angle is converted by a D-A converter to an analog voltage proportional to the actual rotational speed of the spindle, the analog voltage is compared by a comparator with a voltage representative of a commanded speed, and the rotational speed of the spindle is controlled to agree with the commanded speed, the spindle control system comprising:

means for obtaining a specified position pulse signal with the pulse coder at a specified rotational position of the spindle for each rotation;

an error register for setting a predetermined numerical value;

means for converting the content of said error register into a register analog voltage; and a control circuit for regulating application to the comparator of the voltage representative of the commanded speed and the register analog voltage determined from the content of said error register;

wherein, upon application of a demand for stopping the spindle at a predetermined position, the predetermined numerical value is set with the specified position pulse signal in the error register, the pulse train signal is fed back to the error register, and the spindle is controlled to stop at the predetermined position by using the register analog voltage converted from the content of said error register in place of the voltage representative of the commanded speed.

2. A spindle control system according to claim 1, wherein the spindle and a spindle motor for driving the spindle are formed as a unitary structure with each other.

3. A spindle control system according to claim 1, wherein the pulse coder generates one pulse upon each rotation of the spindle through the predetermined rotational angle and generates one pulse at the specified rotational position of the spindle for each rotation.

4. A control system for a machine tool with a rotatable spindle comprising:
(a) a pulse coder, coupled to the spindle, for producing pulse signals corresponding to rotational angular movement of the spindle and a pulse signal corresponding to a predetermined rotational position of the spindle;
(b) means for converting the pulse signals corresponding to rotational angular movement of the spindle to a voltage proportional to the actual rotational speed of the spindle;
(c) means for comparing the voltage proportional to the actual rotational speed of the spindle with a voltage representative of a commanded speed and controlling the actual rotational speed of the spindle to the commanded speed; and
(d) a position controller having a register for setting a predetermined numerical value, having a means for converting the content of said register to a proportional voltage, and having a control circuit for regulating application of the voltage proportional to the commanded speed and the voltage proportional to the content of the register to the comparing and controlling means for governing movement of the spindle; wherein upon receipt of an instruction for stopping the spindle at the predetermined rotational position the predetermined numerical value is set with the position pulse signal and wherein the position controller provides the voltage proportional to the content of the register for stopping the spindle at the predetermined rotational position in place of the voltage representative of the commanded speed.

5. The control system of claim 4, wherein the pulse coder generates a pulse for each rotational movement of the spindle through a predetermined rotational angle and a pulse during each rotation of the spindle at the predetermined rotational position.

6. The control system of claim 4, wherein the comparing and controlling means includes a register for storing a commanded speed value and a D-A converter for converting the registered commanded speed value to an analog voltage proportional to the commanded speed.

7. A control system for a machine tool with a rotatable spindle comprising:

a pulse coder coupled to the spindle for producing pulse signals corresponding to rotational angular movement of the spindle and a pulse signal corresponding to a predetermined rotational position of the spindle;

first means for converting the pulse signals corresponding to rotational angular movement of the spindle to a voltage proportional to the actual rotational speed of the spindle;

a position control circuit, operatively connected to said pulse coder, having a register for setting a predetermined numerical value and having a means for providing a voltage proportional to the content of said register;

second means for providing a voltage representative of a commanded speed;

a third means, operatively connected to said first means, said second means and said position control circuit, for receiving the voltage proportional to the actual rotational speed of the spindle and for providing an output signal for controlling the actual rotational speed of the spindle; and a control circuit, operatively connected to said pulse coder, said position control circuit, said second means, and said third means, for regulating application of the voltage proportional to the commanded speed and the voltage proportional to the content of the register to the third means for governing movement of the spindle;

wherein upon receipt of an instruction for stopping the spindle at the predetermined rotational position the predetermined numerical value is set with the position pulse signal and wherein said position control circuit provides the voltage proportional to the content of the register for stopping the spindle at the predetermined rotational position in place of the voltage representative of the commanded speed.

* * * * *

UNITED STATES PATENT AND TRADEMARK OFFICE
CERTIFICATE OF CORRECTION

PATENT NO. : 4,206,392

DATED : June 3, 1980

INVENTOR(S) : Tokiji Shimajiri et al.

It is certified that error appears in the above-identified patent and that said Letters Patent are hereby corrected as shown below:

```
Column 1, line 16, "work" should be -- workpiece --;
Column 1, line 67, "snychro," should be -- synchro, --;
Column 2, line 50, after "utilized in" insert
          -- the embodiment of --;
Column 2, line 52, after "used in" insert
          -- the embodiment of --;
Column 3, line 7, "Z" should be -- -Z --;
Column 3, line 30, "occuring" should be -- occurring --;
Column 4, line 2, "SWA, a" should be -- SWA.  A --;
Column 4, line 52, after "$\alpha$" insert -- , --;
Column 5, line 67, "mechanisnm" should be -- mechanism --;
Column 6, line 37 [claim 2], "claim 1," should be
          -- claim 1 or 4, --;
Column 7, line 2 [claim 4], after "spindle;" begin new
          paragraph with "wherein upon receipt of an".
```

Signed and Sealed this

Eighteenth Day of November 1980

[SEAL]

Attest:

SIDNEY A. DIAMOND

Attesting Officer        Commissioner of Patents and Trademarks